(12) United States Patent
Bastide et al.

(10) Patent No.: US 10,313,293 B2
(45) Date of Patent: Jun. 4, 2019

(54) SOCIAL DARK DATA

(71) Applicant: INTERNATIONAL BUSINESS MACHINES CORPORATION, Armonk, NY (US)

(72) Inventors: Paul R. Bastide, Boxford, MA (US); Lisa Seacat DeLuca, Baltimore, MD (US); Neal Fishman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/755,572

(22) Filed: Jun. 30, 2015

(65) Prior Publication Data
US 2017/0005963 A1    Jan. 5, 2017

(51) Int. Cl.
H04L 12/58       (2006.01)
G06F 3/0482     (2013.01)
G06Q 50/00     (2012.01)

(52) U.S. Cl.
CPC .............. H04L 51/32 (2013.01); G06Q 50/01 (2013.01)

(58) Field of Classification Search
CPC ................................ H04L 51/12; H04L 51/32
See application file for complete search history.

(56) References Cited

U.S. PATENT DOCUMENTS

| | | | |
|---|---|---|---|
| 8,805,937 B2 | 8/2014 | Bendel et al. | |
| 9,098,176 B1 * | 8/2015 | Tauber | G06F 17/30 |
| 2010/0049534 A1 * | 2/2010 | Whitnah | G06Q 30/02 |
| | | | 705/319 |
| 2012/0245925 A1 * | 9/2012 | Guha | G06F 17/27 |
| | | | 704/9 |
| 2013/0041968 A1 | 2/2013 | Cohen et al. | |
| 2013/0246521 A1 * | 9/2013 | Schacht | G06Q 50/01 |
| | | | 709/204 |
| 2014/0019443 A1 * | 1/2014 | Golshan | G06F 17/30867 |
| | | | 707/723 |
| 2014/0081965 A1 * | 3/2014 | Gross | G06F 17/30699 |
| | | | 707/732 |
| 2014/0229293 A1 * | 8/2014 | Huang | G06Q 30/0273 |
| | | | 705/14.69 |

(Continued)

FOREIGN PATENT DOCUMENTS

WO    2014064527 A1    5/2014

OTHER PUBLICATIONS

Anonymous; "Method and System for Presenting Relevant Content to a User based on Current Activity on a Social Network," 2013, ip.com; 3 pages <http://null/IPCOM/000233917>.

*Primary Examiner* — Nicholas Taylor
*Assistant Examiner* — Sanjoy Roy
(74) *Attorney, Agent, or Firm* — Peter B. Stewart; Moore & Van Allen PLLC

(57) ABSTRACT

A method for reorganizing unread content in a social networking system may include identifying a plurality of content elements associated with a first user of a social networking system and identifying from the plurality of content elements a plurality of unread content elements associated with the first user. Typically, a score of each of the plurality of each of the plurality of unread content elements is then determined. Thereafter, one or more of the plurality of unread content elements are provided based on the scores of the plurality of unread content elements to a computing device of the first user for display.

14 Claims, 3 Drawing Sheets

(56) References Cited

U.S. PATENT DOCUMENTS

| | | | |
|---|---|---|---|
| 2015/0081449 A1* | 3/2015 | Ge | G06F 17/30867 |
| | | | 705/14.66 |
| 2015/0234550 A1* | 8/2015 | Kim | G06F 3/0482 |
| | | | 715/745 |
| 2016/0021213 A1* | 1/2016 | Ruan | G06Q 50/01 |
| | | | 709/204 |
| 2016/0286002 A1* | 9/2016 | Marra | H04L 51/32 |

\* cited by examiner

SOCIAL DARK DATA

BACKGROUND

Aspects of the present invention relate to a system for evaluating and organizing social network data. In this regard, a need exists for an improved system for evaluating and organizing social network data.

SUMMARY

In one aspect, the present invention embraces a method for reorganizing unread content in a social networking system and an associated system and computer program product.

In one embodiment, the method includes identifying a plurality of content elements associated with a first user of a social networking system. A plurality of unread content elements associated with the first user are identified from the plurality of content elements. A score of each of the plurality of unread content elements is determined. One or more of the plurality of unread content elements are then provided based on the scores of the plurality of unread content elements to a computing device of the first user for display. The associated system and computer program product may be configured to perform the steps of the method.

In some embodiments, the method includes determining whether one or more other users of the social networking system have performed one or more social media actions with one or more of the plurality of unread content elements, wherein determining the score of each of the plurality of unread content elements is based on whether one or more of the other users of the social networking system have performed one or more social media actions with one or more of the plurality of unread content elements.

In some embodiments and in combination with any of the above embodiments, the method includes determining a social network relationship between the first user and the other users of the social networking system, wherein determining the score of each of the plurality of unread content elements is further based on the social network relationship between the first user and the other users of the social networking system.

In some embodiments and in combination with any of the above embodiments, the method includes determining a social media action type of the one or more social media actions, wherein determining the score of each of the plurality of unread content elements is further based on the social media action type of the one or more social media actions.

In some embodiments and in combination with any of the above embodiments, the method includes determining a display order for the plurality of unread content elements based on the score of each unread content element, wherein providing one of more of the plurality of unread content elements comprises providing the plurality of unread content elements to the computing device of the first user for display based on the display order.

In some embodiments and in combination with any of the above embodiments, the method includes determining a number of the plurality of unread content elements, and determining that the number of the plurality of unread content elements exceeds an unread content element threshold, wherein providing one of more of the plurality of unread content elements is based on determining that the number of the plurality of unread content elements exceeds the unread content element threshold.

In some embodiments and in combination with any of the above embodiments, the method includes retrieving the plurality of unread content elements associated with the first user from a content element repository, wherein determining the score of each of the plurality of unread content elements comprises performing natural language processing of each of the plurality of unread content elements.

In some embodiments and in combination with any of the above embodiments, identifying the plurality of unread content elements comprises identifying a plurality of unread content elements associated with a first period of time, and providing one of more of the plurality of unread content elements comprises providing one or more of the plurality of unread content elements associated with the first time period based on the score of each unread content element.

In some embodiments and in combination with any of the above embodiments, the first period of time comprises a period of time since the first user last accessed the social networking system.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
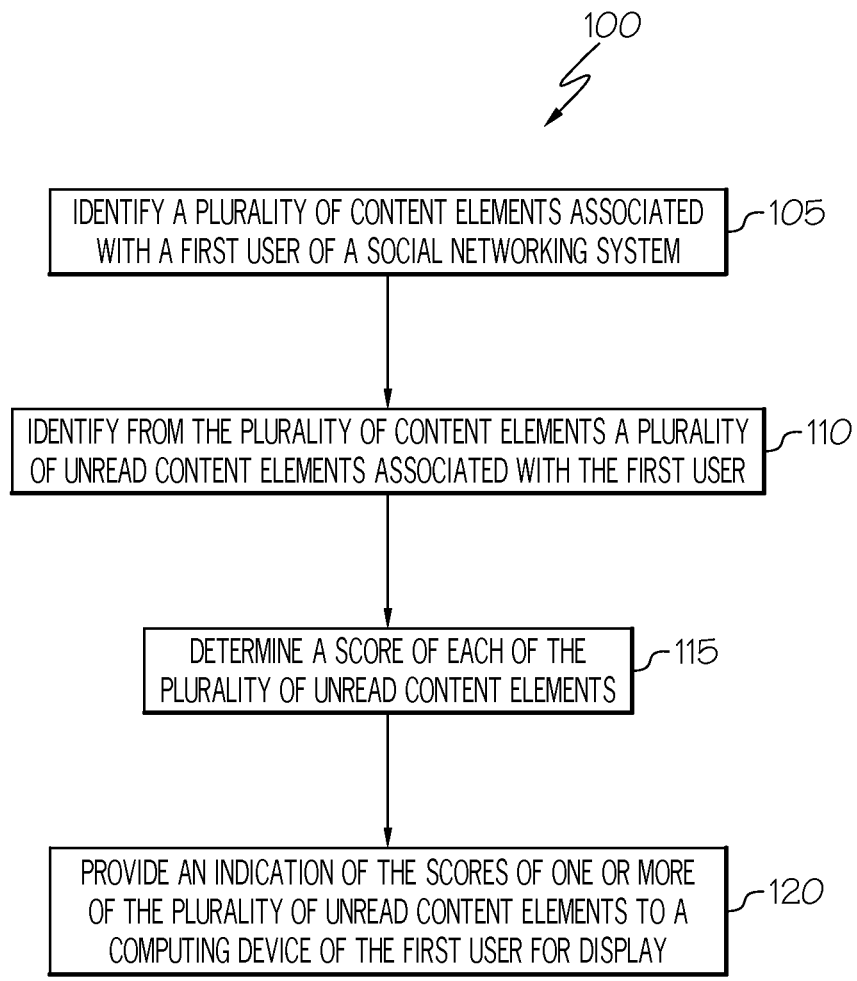
FIG. 1A depicts an exemplary method for reorganizing unread content in a social networking system in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, "content elements" refer to any type of content that may be provided to a user of a social networking system. For example, a content element may be an instant message, an email message, a posting, or any other type of message or other content.

As used herein, "dark data" is data found in data repositories that has not been analyzed or processed. Dark data is typically unstructured data. Dark data includes "unread" content elements within a social networking system. Typically, a content element is unread if it has not been read or otherwise interacted with by its intended recipient.

In one aspect, the present invention embraces a method for reorganizing unread content in a social networking system. In this regard, FIG. 1A depicts an exemplary method 100 for reorganizing unread content in a social networking system.

Accordingly, at block 105, content elements associated with a first user of a social networking system are identified. In this regard, the content elements may be retrieved by an unread content reorganization system from a content element database or other repository of the social networking system. In some embodiments, only content elements associated with a defined period of time may be retrieved. For example, only content elements created or received within a defined time period may be retrieved. The defined time period may be the time period since the first user last accessed the social networking system. Alternatively, the defined time period may be a fixed amount of time such as the previous week or previous day. This time period may be defined by the entity operating the unread content reorganization system, the first user, or by the social networking system.

In some embodiments, the method 100 may be initiated based on the first user accessing the social networking system. In some embodiments, the first user may be required to authenticate his/her identity using a user name, a passcode, a cookie, a biometric identifier, a private key, a token, and/or another authentication mechanism before being allowed to access the social networking system and/or the unread content reorganization system.

At block 110, unread content elements associated with the first user are identified from the content elements. Any way of identifying unread content elements is within the scope of the present invention. Identifying unread content elements may include identifying those content elements that were created and/or received by the social networking system since the first user last accessed the social networking system (e.g., since the first user last accessed a messaging application programming interface (API)). In some instances, content elements may include metadata indicating whether or not such content elements have been read by the first user. If so, this metadata may be analyzed by the unread content reorganization system to determine whether or not each content element has been read. In some embodiments, a data repository monitor may be employed to determine whether the first user has accessed content elements stored in a content element repository. The unread content reorganization system may determine whether messages or other content elements have been interacted with by the first user, such as by being forwarded, reposted, replied, read, commented on, liked, having a screenshot taken by the first user, and/or otherwise interacted with by the first user. That said, a content element is typically not considered to be read based solely on the content element being downloaded to a computing device of the first user or being passively displayed to the first user, such as being displayed on the first user's social media wall or feed.

In some embodiments, only unread content elements associated with a defined period of time may be identified. For example, only unread content elements created or received within a defined time period may be identified. The defined time period may be the time period since the first user last accessed the social networking system. Alternatively, the defined time period may be a fixed amount of time such as the previous week or previous day. This time period may be defined by the entity operating the unread content reorganization system, the first user, or by the social networking system.

Next, a block 115, a score (e.g., an interest score) is determined for each of the unread content elements (e.g., based on content evaluation rules stored in the unread content reorganization system). In this regard, the score may be based at least in part on the unread content reorganization system performing natural language processing of the unread content elements to assess the meaning and value of the unread content elements to the first user. For example, the unread content reorganization system may search for contextual key words and/or phrases that may be of interest to the first user. Such key words and/or phrases may relate to topics specified by the first user or by the social networking system, which may be of interest to the first user. Topics of interest to the first user may also be identified based on the first user's history within the social networking system and/or the first user's social networking profile within the social networking system. Typically, an unread content element may have a higher score if, based on performing natural language processing, the unread content reorganization system determines that the unread content element is likely to be of higher interest and/or value to the first user.

The score for each of the unread content elements may be based at least in part on a social network relationship between the first user and the sender and/or author of an unread content element. Typically, the social network relationship is based on the degree of the relationship between the first user and the sender and/or author within a particular social network. In this regard, two users would have a first degree relationship if they are directly connected (e.g., are friends) within a social network, and two users would have a second degree relationship if they are not directly connected, but share a mutual connection (e.g., a mutual friend) within a social network. In other embodiments, the social network relationship may be based on: whether or not two users are members of the same group with a social network, common interests between two users, similar user profiles within a social network, or any other commonality between two users within a social network. Typically, an unread content element may have a higher score if the first user has a closer relationship with the sender and/or author (e.g., a first degree relationship may have a higher score than a second degree relationship) of the unread content element.

In addition, the score for each of the unread content elements may be based at least in part on other users of the social networking system performing one or more social media actions with a content element unread by the first user. In this regard, a content element sent to the first user have been also been sent to other users of the social networking system, some of whom may have interacted with the content element. For example, a content element unread by the first user have been forwarded, reposted, replied to, commented on, read, liked, and/or otherwise interacted with one or more other users of the social networking system. Typically, a content element unread by the first user may have a higher score if other users of the social networking system have interacted with the content element. The score of a content element may be further based on the social network relationship between the first user and the other users that have interacted with the content element (e.g., a content element interacted with by other users having a first degree relationship may have a higher score than a content element interacted with by other users having a second degree relationship). The score of a content element may be further based on the number of other users that have interacted with the content element (e.g., a content element interacted with by a higher number of other users may have a higher score). The score of a content element may be further based on a social media action type performed by one or more other users. For example, a content element liked, replied to, commented on, reposted, or forwarded by other users may have a higher score than a content element that has merely been read by other users. The score of a content element may be further based on whether the other users that have interacted with the content element having an expertise in or interest in a topic of a content element, which may be identified based on key words and/or phrases in the content element.

Prior to scoring the unread content elements, if the unread content elements have not already been retrieved, the unread content elements may be retrieved from a content element repository (e.g., a content element repository of the social networking system) to facilitate scoring the unread content elements.

At block 120, an indication of the scores of one or more of the unread content elements is provided to a computing device of the first user for display (e.g., via a graphical user interface (GUI) provided by the unread content reorganization system or the social networking system to the first user's computing device, such as a computer, laptop, tablet computer, or mobile phone). As used herein, providing an indication of the scores of one or more of the unread content elements includes any way of providing (e.g., displaying) unread content elements based on their scores (e.g., so that unread content elements with the highest scores can be readily viewed). The actual scores are typically not displayed. Rather, providing the indication of the scores of one or more of the unread content elements typically includes determining a display order for the unread content elements and providing the unread content elements for display based on the display order. In this regard, rather than displaying the unread content elements based on the order in which they were created and/or received, the unread content may be reorganized so that content elements with the highest scores are displayed first to the first user. In addition or alternatively, unread content elements having a sufficiently high score may be highlighted, bolded, colored, or otherwise altered (e.g., by applying one or more styles) to emphasize their importance to the first user, and unread content elements having a sufficiently low score may be removed from display, collapsed, grayed out, or otherwise altered to deemphasize their importance to the first user, thereby indicating to the first user which content elements have the highest scores and, thus, the most importance to the first user. In some embodiments, unread content elements having high scores may be reposted or resent to the first user. Typically, providing an indication of the score of an unread content element will not change the status of that content element as being unread (e.g., providing an indication of the score may not change metadata indicating that a content element is unread).

Figure 1B:
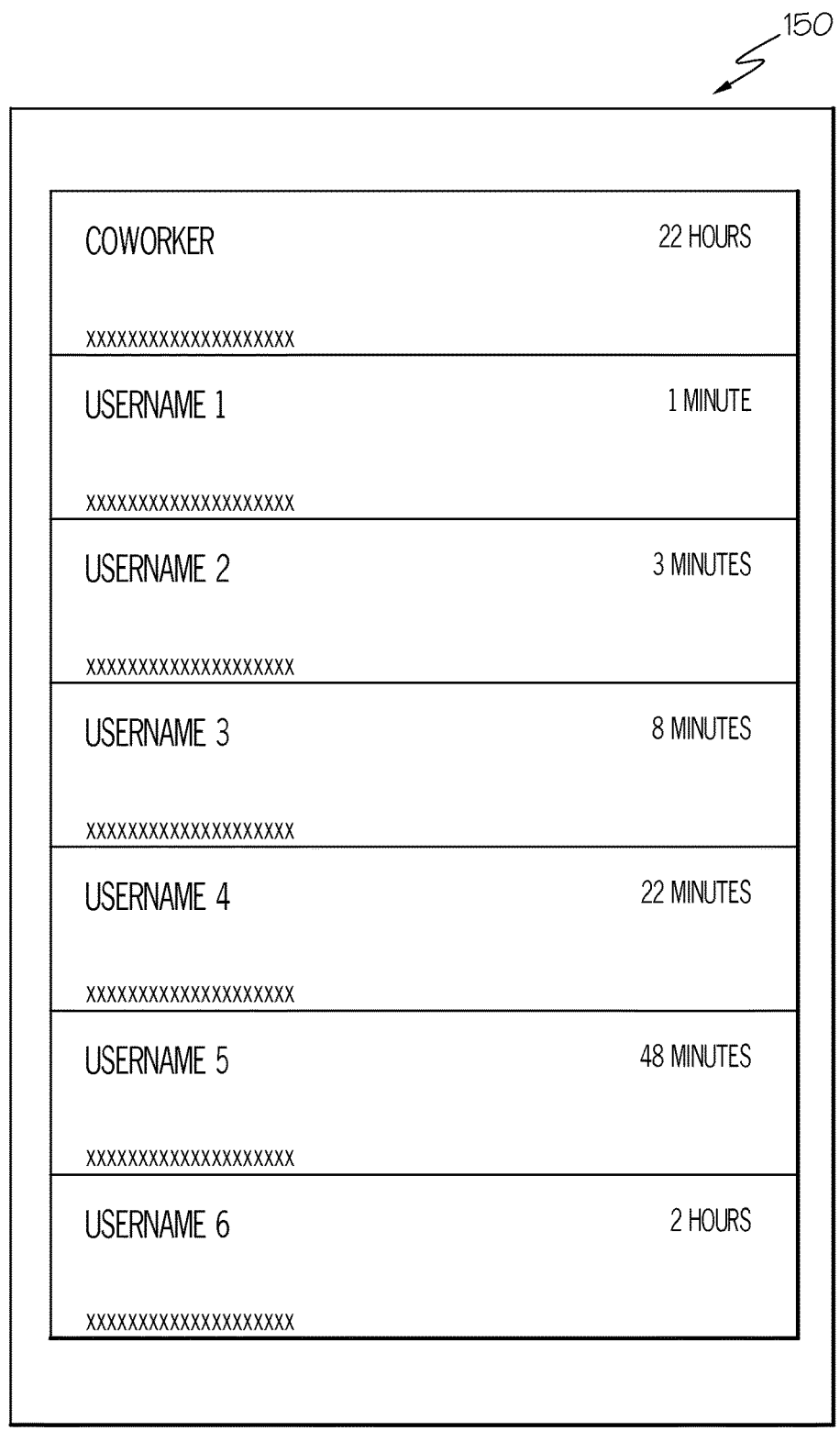
FIG. 1B depicts an exemplary user interface in accordance with an embodiment of the present invention.

FIG. 1B depicts an exemplary user interface 150 displaying unread content elements based on a determined display order. In this regard, the first user may be away from a social networking system for 24 hours and may receive numerous messages within the social networking system including an important message from a coworker. If all of the messages were displayed based on when they were received, the first user may have difficulty locating the message from the coworker due to a large number of intervening messages. However, the messages may be scored and the message from the coworker may receive a high score (e.g., due to the same message being read, forwarded, liked, or commented on by other users having a first degree relationship with the first user in the social networking system). Accordingly, the message from the coworker with a high score is displayed in FIG. 1B on the top of a list of messages and other messages that do not have a sufficiently high score are displayed based on when they were received. Accordingly, when the user interface 150 is displayed to the first user, the first user can readily view the message from the coworker, and can then discuss the content of the message with the coworker.

In some embodiments, only unread content elements associated with a defined period of time may be scored and/or have an indication of the scores provided for display. For example, only unread content elements created or received within a defined time period may be scored and/or have an indication of the scores provided for display. The defined time period may be the time period since the first user last accessed the social networking system. Alternatively, the defined time period may be a fixed amount of time such as the previous week or previous day. This time period may be defined by the entity operating the unread content reorganization system, the first user, or by the social networking system.

In some embodiments, unread content elements may only be scored and/or have an indication of the scores provided for display if the number of unread content elements exceeds an unread content element threshold. In this regard, once the unread content elements associated with the first user are identified, the number of unread content elements may be determined. If the number of unread content elements exceeds the unread content element threshold, then the unread content elements may be scored and/or have an indication of the scores provided for display. By way of example, the unread content element threshold may be ten unread content elements, twenty unread content elements, or any other number of unread content elements defined by the entity operating the unread content reorganization system, the first user, or by the social networking system.

In some embodiments, unread content elements being displayed may be further sorted by one or more topics using contextual key words and/or phrases in the unread content elements.

The method 100 may be repeated each time the first user accesses the social networking system thereby updating the scores of the unread content elements and the indication of the scores provided for display. In other embodiments, the method 100 may be repeated according to a defined schedule, such as repeating the method 100 once per day or once every few hours. In other embodiments, the method 100 may be performed the first time the first user accesses the social networking system within a defined time period (e.g., one day), but is only performed once during such time period.

In some embodiments, if the first user is currently accessing the social networking system, the scores of the unread content elements and the indication of the scores provided for display may be updated (e.g., updated in real time) based on the first user receiving new content elements.

As evident from the preceding description, the unread content reorganization system represents an improvement in technology by presenting unread content elements to a user of a social networking system so that the user can readily view the content most important to the user. Indeed, the unread content reorganization system typically reorganizes the unread content elements so that the most important content elements are displayed first, rather than the unread content elements being displayed based on the order in which they were received. Accordingly, the unread content reorganization system provides a technical solution for overcoming the problem of a user of a social networking system having more content than the user can realistically consume, which can result in the user overlooking important content. The unread content reorganization system allows a user to easily identify important unread content, without having to review a lot of unimportant content.

In some embodiments, unread content elements identified by the unread content reorganization system for one or more users may be further analyzed to determine what types of content elements are unread, what types of content elements are read, and what types of content elements are unread but given high scores. With such information, statistical and other analysis of dark data for a large group of users can be performed. Based on this analysis dark data for users of a social networking system may be predicted. Moreover, based on this analysis, content could be tailored to reduce the likelihood of content not being read by an intended recipient. In some embodiments, based on this analysis, the content evaluation rules of the unread content reorganization system may be modified to better identify unread content elements.

Figure 2:
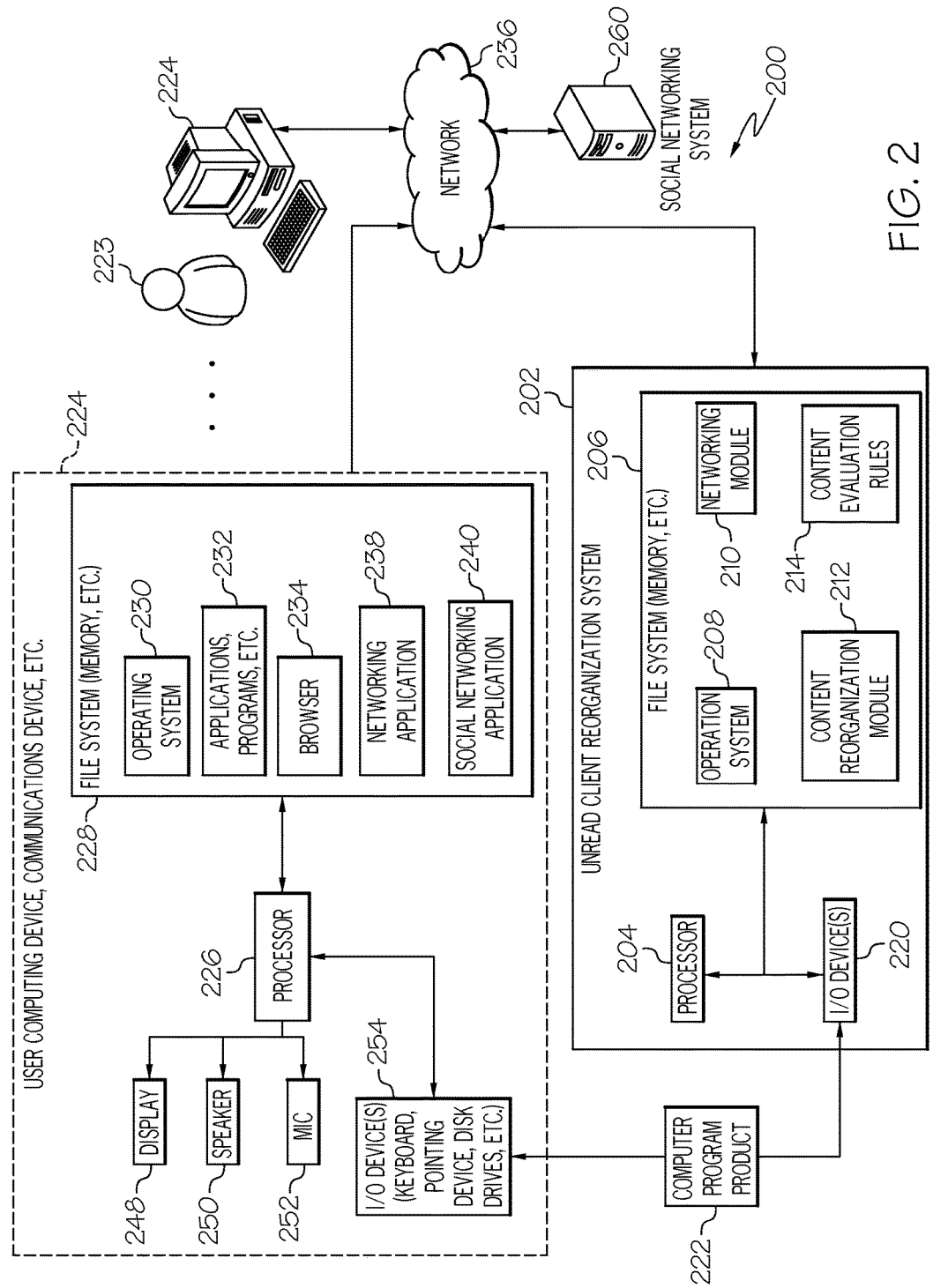
FIG. 2 is a block schematic diagram of an exemplary system for reorganizing unread content in a social networking system in accordance with an embodiment of the present invention.

FIG. 2 is a block schematic diagram of an example of a system 200 for reorganizing unread content in a social networking system in accordance with an embodiment of the present invention. The method 100 of FIG. 1A may be embodied in and performed by the system 200. The system 200 may include an unread content reorganization system 202. The unread content reorganization system 202 may be a server or similar processing device. The unread content reorganization system 202 may include a processor 204 for controlling operation of the unread content reorganization system 202 for performing functions, such as those described herein with respect to evaluating and reorganizing social media content elements. The unread content reorganization system 202 may also include a file system 206 or memory. An operating system 208, applications and other programs may be stored on the file system 206 for running or operating on the processor 204. A networking module 210 or system may also be stored on the file system 206 and may be compiled and run on the processor 204 to perform the function of allowing the unread content reorganization system 202 to communicate with other devices similar to those described herein. The networking module 210 may be any type of online communications mechanism for online communications or conversations.

A content reorganization module 212 or system may also be stored on the file system 206. The method 100 of FIG. 1A may be embodied in the content reorganization module 212 and may be performed by the processor 204 when the content reorganization module 212 is compiled and run on the processor 204. The content reorganization module 212 may operate in association with the networking module 210 and other types of communications media to perform the functions and operations associated with the method 100. In another embodiment, the content reorganization module 212 may be a component of the networking module 210 and may operate in association with the networking module 210 and other communications media.

Content evaluation rules 214 may also be stored on the file system 206. The content evaluation rules 214 may be used by the content reorganization module 212 to score contents elements. In another embodiment, the content evaluation rules 214 may be a component of the networking module 210.

The unread content reorganization system 202 may also include one or more input devices, output devices or combination input/output devices, collectively I/O devices 220. The I/O devices 220 may include, but are not necessarily limited to, a keyboard or keypad, pointing device, such as a mouse, disk drive and any other devices to permit a user to interface with and control operation of the unread content reorganization system 202 and to communicate with other devices and systems. For example, the unread content reorganization system 202 may communicate with the social networking system 260 to retrieve social media content elements associated with a user. In some embodiments, the unread content reorganization system 202 may be a component of the social networking system 260. At least one of the I/O devices 220 may be a device to read a computer program product, such as computer program product 222. The computer program product 222 may be similar to that described in more detail herein. The networking module 210 and the content reorganization module 212 may be loaded on the file system 206 from a computer program product, such as computer program product 222.

A user 223 may use a computing device 224 or communications device to access the unread content reorganization system 202, networking module 210 or content reorganization module 212. The computing device 224 or communications device may be any sort of communications device, including a mobile or handheld computer or communications device. The computing device 224 may include a processor 226 to control operation of the computing device 224 and a file system 228, memory or similar data storage device. An operating system 230, applications 232 and other programs may be stored on the file system 228 for running or operating on the processor 226. A web or Internet browser 234 may also be stored on the file system 228 for accessing the unread content reorganization system 202 and/or the social networking system 260 via a network 236. The network 236 may be the Internet, an intranet or other private or proprietary network.

A networking application 238 for may also be stored on the file system 228 and operate on the processor 226 of the computing device 224.

In accordance with an embodiment, a social networking application 240 may also be stored on the file system 228. Aspects of the method 100 in FIG. 1A may be embodied and performed by the social networking application 240. In accordance with another embodiment, the social networking application 240 may be part of the networking application 238.

The social networking application 240 operating on the computing device 224 may interface with or operate in conjunction with the content reorganization module 212 on the unread content reorganization system 202 to perform the functions and operations described herein for reorganizing unread content in a social networking system. Accordingly, the social networking application 240 operating on the computing device 224 may perform some of the functions and operations of the method 100 and the content reorganization module 212 operating on the unread content reorganization system 202 may perform other functions of the method 100. Some embodiments of the present invention may include only the content reorganization module 212 operating on the unread content reorganization system 202, and other embodiments may include only the social networking application 240 operating on the computing device 224. In some embodiment, the web or Internet browser 234 may interface with or operate in conjunction with the content reorganization module 212 on the unread content reorganization system 202 to perform the functions and operations described herein for reorganizing unread content in a social networking system.

The computing device 224 may also include a display 248, a speaker system 250, and a microphone 252 for voice communications. One or more user interfaces may be presented on the display 248 for controlling operation of the computing device 224 (e.g., for controlling operation of the networking application 240) and for performing the operations and functions described herein.

The computing device 224 may also include one or more input devices, output devices or combination input/output devices, collectively I/O devices 254. The I/O devices 254 may include a keyboard or keypad, pointing device, such as a mouse, disk drives and any other devices to permit a user, such as user 223, to interface with and control operation of the computing device 224 and to access networking application 240 and/or content reorganization module 212 on unread content reorganization system 202. The I/O devices 254 may also include at least one device configured to read computer code from a computer program product, such as computer program product 222.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, when it is said herein that something is "based on" something else, it may be based on one or more other things as well. In other words, unless expressly indicated otherwise, as used herein "based on" means "based at least in part on" or "based at least partially on."

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A computerized method for providing, via a graphical user interface, altered unread content in a computerized social networking system, comprising:
    identifying, by a computer processor, a plurality of content elements associated with a first user of the computerized social networking system;
    identifying, by a computer processor, from the plurality of content elements a plurality of unread content elements associated with the first user, wherein the plurality of unread content elements comprises content elements that have been displayed to the first user but not interacted with by the first user;
    determining whether one or more other users of the computerized social networking system have performed one or more social media actions with one or more of the plurality of unread content elements;
    determining a social media action type of the one or more social media actions;
    based on (1) whether one or more of the other users of the computerized social networking system have performed one or more social media actions with one or more of the plurality of unread content elements, (2) the social media action type of the one or more social media actions performed with one or more of the plurality of unread content elements by one or more of the other users of the computerized social networking system, and (3) an expertise that the one or more of the other users of the computerized social networking system have in topics of the plurality of unread content elements, determining, by a computer processor, a score of each of the plurality of unread content elements;
    determining, by a computer processor, a number of the plurality of unread content elements;
    determining, by a computer processor, that the number of the plurality of unread content elements exceeds an unread content element threshold; and
    in response to determining that the number of the plurality of unread content elements exceeds the unread content element threshold, altering, by a computer processor, one or more of the plurality of unread content elements by (i) highlighting, bolding, coloring, or applying one or more styles to a first subset of the plurality of unread content elements having scores above a high score threshold and (ii) removing, collapsing, or graying out a second subset of the plurality of unread content elements having scores below a low score threshold, and providing the altered unread content elements to a computing device of the first user for display via a graphical user interface.

2. The method of claim 1, comprising:
    determining a social network relationship between the first user and the other users of the social networking system;
    wherein determining the score of each of the plurality of unread content elements is further based on the social network relationship between the first user and the other users of the social networking system.

3. The method of claim 1, comprising:
    determining a display order for the altered unread content elements based on the score of each altered unread content element;
    wherein providing the altered unread content elements comprises providing the altered unread content elements to the computing device of the first user for display based on the display order.

4. The method of claim 1, comprising:
    retrieving the plurality of unread content elements associated with the first user from a content element repository;
    wherein determining the score of each of the plurality of unread content elements comprises performing natural language processing of each of the plurality of unread content elements.

5. The method of claim 1, wherein:
    identifying the plurality of unread content elements comprises identifying a plurality of unread content elements associated with a first period of time; and
    altering one or more of the plurality of unread content elements comprises altering one or more of the plurality of unread content elements associated with the first time period based on the score of each unread content element.

6. The method of claim 5, wherein the first period of time comprises a period of time since the first user last accessed the social networking system.

7. A system for providing, via a graphical user interface, altered unread content in a computerized social networking system, comprising:
    a processor;
    a memory;

a module for providing unread content in the computerized social networking system stored in the memory, executable by the processor and configured for:

identifying a plurality of content elements associated with a first user of the computerized social networking system;

identifying from the plurality of content elements a plurality of unread content elements associated with the first user, wherein the plurality of unread content elements comprises content elements that have been displayed to the first user but not interacted with by the first user;

determining whether one or more other users of the computerized social networking system have performed one or more social media actions with one or more of the plurality of unread content elements;

determining a social media action type of the one or more social media actions;

based on (1) whether one or more of the other users of the computerized social networking system have performed one or more social media actions with one or more of the plurality of unread content elements, (2) the social media action type of the one or more social media actions performed with one or more of the plurality of unread content elements by one or more of the other users of the computerized social networking system, and (3) an expertise that the one or more of the other users of the computerized social networking system have in topics of the plurality of unread content elements, determining a score of each of the plurality of unread content elements;

determining a number of the plurality of unread content elements;

determining that the number of the plurality of unread content elements exceeds an unread content element threshold; and in response to determining that the number of the plurality of unread content elements exceeds the unread content element threshold, altering one or more of the plurality of unread content elements by (i) highlighting, bolding, coloring, or applying one or more styles to a first subset of the plurality of unread content elements having scores above a high score threshold and (ii) removing, collapsing, or graying out a second subset of the plurality of unread content elements having scores below a low score threshold, and providing the altered unread content elements to a computing device of the first user for display via a graphical user interface.

8. The system of claim 7, wherein the module is further configured for:

determining a social network relationship between the first user and the other users of the social networking system;

wherein determining the score of each of the plurality of unread content elements is further based on the social network relationship between the first user and the other users of the social networking system.

9. The system of claim 7, wherein the module is further configured for:

determining a display order for the altered unread content elements based on the score of each altered unread content element;

wherein providing the altered unread content elements comprises providing the altered unread content elements to the computing device of the first user for display based on the display order.

10. The system of claim 7, wherein the module is further configured for:

retrieving the plurality of unread content elements associated with the first user from a content element repository;

wherein determining the score of each of the plurality of unread content elements comprises performing natural language processing of each of the plurality of unread content elements.

11. The system of claim 7, wherein:

identifying the plurality of unread content elements comprises identifying a plurality of unread content elements associated with a first period of time; and altering one or more of the plurality of unread content elements comprises altering one or more of the plurality of unread content elements associated with the first time period based on the score of each unread content element.

12. The system of claim 11, wherein the first period of time comprises a period of time since the first user last accessed the social networking system.

13. A computer program product for providing, via a graphical user interface, altered unread content in a computerized social networking system comprising a non-transitory computer-readable storage medium having computer-executable instructions for:

identifying a plurality of content elements associated with a first user of the computerized social networking system;

identifying from the plurality of content elements a plurality of unread content elements associated with the first user, wherein the plurality of unread content elements comprises content elements that have been displayed to the first user but not interacted with by the first user;

determining whether one or more other users of the computerized social networking system have performed one or more social media actions with one or more of the plurality of unread content elements;

determining a social media action type of the one or more social media actions;

based on (1) whether one or more of the other users of the computerized social networking system have performed one or more social media actions with one or more of the plurality of unread content elements, (2) the social media action type of the one or more social media actions performed with one or more of the plurality of unread content elements by one or more of the other users of the computerized social networking system, and (3) an expertise that the one or more of the other users of the computerized social networking system have in topics of the plurality of unread content elements, determining a score of each of the plurality of unread content elements;

determining a number of the plurality of unread content elements;

determining that the number of the plurality of unread content elements exceeds an unread content element threshold; and in response to determining that the number of the plurality of unread content elements exceeds the unread content element threshold, altering one or more of the plurality of unread content elements by (i) highlighting, bolding, coloring, or applying one or more styles to a first subset of the plurality of unread content elements having scores above a high score threshold and (ii) removing, collapsing, or graying out a second subset of the plurality of unread content elements having scores below a low score threshold, and providing the altered unread content elements to a computing device of the first user for display via a graphical user interface.

14. The computer program product of claim 13, wherein the non-transitory computer-readable storage medium has computer-executable instructions for:
   determining a display order for the altered unread content elements based on the score of each altered unread content element;
   wherein providing the altered unread content elements comprises providing the altered unread content elements to the computing device of the first user for display based on the display order.

* * * * *